(12) United States Patent
Pelgrum

(10) Patent No.: US 12,665,320 B2
(45) Date of Patent: Jun. 23, 2026

(54) SIGNAL PROCESSING FOR DRIVING ANTENNAS FOR A SPACECRAFT OR TERRESTRIAL VEHICLE

(71) Applicant: Blue Origin Manufacturing, LLC, Huntsville, AL (US)

(72) Inventor: Wouter Pelgrum, Issaquah, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 40 days.

(21) Appl. No.: 18/805,917

(22) Filed: Aug. 15, 2024

(65) Prior Publication Data

US 2026/0051669 A1      Feb. 19, 2026

(51) Int. Cl.
*H01Q 21/30*          (2006.01)
*H01Q 1/28*           (2006.01)
*H04W 64/00*          (2009.01)

(52) U.S. Cl.
CPC ............. *H01Q 21/30* (2013.01); *H01Q 1/288* (2013.01); *H04W 64/003* (2013.01)

(58) Field of Classification Search
CPC .............................. H01Q 21/30; H01Q 1/288
See application file for complete search history.

(56) References Cited

U.S. PATENT DOCUMENTS

| | | |
|---|---|---|
| 6,018,315 A | 1/2000 | Ince et al. |
| 6,281,841 B1 | 8/2001 | Nevill |
| 7,605,749 B2 | 10/2009 | Lawrence |
| 7,642,957 B2 | 1/2010 | Lenne et al. |
| 7,663,548 B2 | 2/2010 | McKay et al. |
| 7,755,552 B2 | 7/2010 | Schantz et al. |
| 8,576,768 B2 | 11/2013 | Zhao et al. |
| 9,778,368 B2 | 10/2017 | Krantz et al. |
| 2003/0030508 A1 | 2/2003 | Wangsvick et al. |
| 2021/0055425 A1 | 2/2021 | Guo et al. |

FOREIGN PATENT DOCUMENTS

| | | |
|---|---|---|
| CN | 213278397 U | 5/2021 |

OTHER PUBLICATIONS

Altan, Dual Antenna Use on a Gps Receiver, International Telemetering Conference Proceedings 44, Oct. 1, 2008.
Lin, et al., Design and Implementation of a Dual-antenna Gps Receiver, Journal of Physics: Conference Series 1509(1): 012029, Apr. 1, 2020.

*Primary Examiner* — Graham P Smith

(74) *Attorney, Agent, or Firm* — Knobbe Martens Olson & Bear LLP

(57) ABSTRACT

An antenna and receiver design is described herein that allows a spacecraft to safely and accurately perform an autonomous flight safety system, an ascent, an entry, a re-entry, a landing, and/or an orbit determination. For example, a spacecraft can be equipped with 180-degree dual-opposed antennas and two receivers. A signal captured by a first antenna can be routed to a secondary radio frequency (RF) of the first receiver and to a combiner. A signal captured by a second antenna can be routed to a secondary RF of the second receiver and to the combiner. The mixer can perform the phase combination operation on the signals captured by the first receiver and the second receiver to produce a phase combined signal, and can route the phase combined signal to the primary RF of the first receiver and to the primary RF of the second receiver.

20 Claims, 3 Drawing Sheets

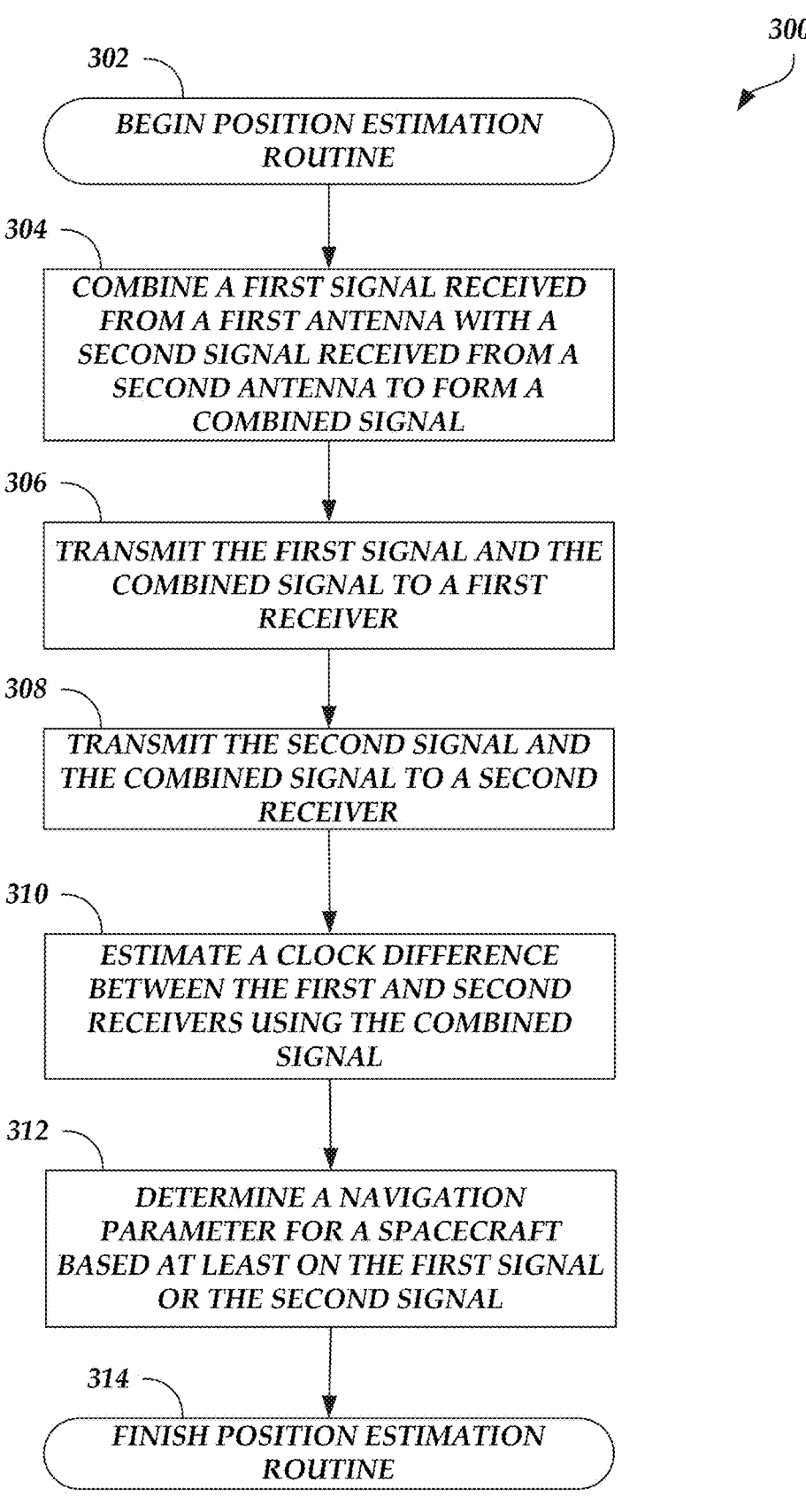

*300*

302

BEGIN POSITION ESTIMATION
ROUTINE

304

COMBINE A FIRST SIGNAL RECEIVED
FROM A FIRST ANTENNA WITH A
SECOND SIGNAL RECEIVED FROM A
SECOND ANTENNA TO FORM A
COMBINED SIGNAL

306

TRANSMIT THE FIRST SIGNAL AND THE
COMBINED SIGNAL TO A FIRST
RECEIVER

308

TRANSMIT THE SECOND SIGNAL AND
THE COMBINED SIGNAL TO A SECOND
RECEIVER

310

ESTIMATE A CLOCK DIFFERENCE
BETWEEN THE FIRST AND SECOND
RECEIVERS USING THE COMBINED
SIGNAL

312

DETERMINE A NAVIGATION
PARAMETER FOR A SPACECRAFT
BASED AT LEAST ON THE FIRST SIGNAL
OR THE SECOND SIGNAL

314

FINISH POSITION ESTIMATION
ROUTINE

*Fig. 3*

SIGNAL PROCESSING FOR DRIVING ANTENNAS FOR A SPACECRAFT OR TERRESTRIAL VEHICLE

TECHNICAL FIELD

The present disclosure relates to systems and techniques for signal processing for driving antennas for a spacecraft or terrestrial vehicle to achieve, among other things, an accurate and reliable a position, velocity, and/or timing solution.

BACKGROUND

An extraterrestrial vehicle may be a space lander, a rover, a rocket, a satellite, a spaceship, a space shuttle, and/or any other type of vehicle that is capable of operating in space and/or on an extraterrestrial object other than Earth (hereinafter a "spacecraft"). A spacecraft may be capable of carrying a payload from the surface of an extraterrestrial object (e.g., a planet, such as Earth, a moon, an asteroid, etc.) into space. Some spacecraft may be designed for single-use travel (e.g., designed to travel only from the surface of one extraterrestrial object to space). Other spacecraft may be designed for multi-use travel (e.g., designed to travel from the surface of an extraterrestrial object to space, and from space to the surface of the same extraterrestrial object or another extraterrestrial object).

A satellite navigation system, such as a global navigation satellite system (GNSS), can be used to guide the spacecraft. For example, global positioning system (GPS), global navigation satellite system (GLONASS), BeiDou Navigation Satellite System, Galileo, Quasi-Zenith Satellite System (QZSS), and/or Indian Regional Navigation Satellite System (IRNSS) can be used to guide the spacecraft. The satellite navigation system can provide information to the spacecraft that allows the spacecraft to determine position, velocity, and/or timing. The position, velocity, and/or timing calculation can help the spacecraft identify and reach an intended destination.

SUMMARY

Various embodiments of systems, methods, and devices within the scope of the appended claims each have several aspects, no single one of which is solely responsible for the desirable attributes described herein. Without limiting the scope of the appended claims, some prominent features are described herein.

In some aspects, the techniques described herein relate to a navigation system including: a first antenna positioned in a first direction; a second antenna positioned in a second direction that is about 180 degrees from the first direction; a combiner coupled to the first antenna and the second antenna, the combiner configured to combine a first signal received from the first antenna with a second signal received from the second antenna to form a combined signal; a first receiver coupled to the first antenna and the combiner, the first receiver having a first port configured to receive the combined signal from the combiner and a second port configured to receive the first signal from the first antenna; a second receiver coupled to the second antenna and the combiner, the second receiver having a first port configured to receive the combined signal from the combiner and a second port configured to receive the second signal from the second antenna; and a processing unit coupled to the first receiver and the second receiver, the processing unit configured to: estimate a clock difference between the first receiver and the second receiver using the combined signal, time-synchronize the first signal with the second signal using the estimated clock difference, and determine a navigation parameter for a spacecraft using the time-synchronized first and second signals.

In some aspects, the techniques described herein relate to a navigation system, wherein the processing unit is further configured to: single-difference a phase-combined pseudorange of the second receiver from a phase-combined pseudorange of the first receiver to form a single-difference phase-combined pseudorange; and remove one or more outliers from the single-difference phase-combined pseudorange to form a modified single-difference phase-combined pseudorange.

In some aspects, the techniques described herein relate to a navigation system, wherein the processing unit is further configured to: double-difference a phase-combined carrier phase of the second receiver from a phase-combined carrier phase of the first receiver to form a double-difference phase-combined carrier phase; and remove one or more outliers from the double-difference phase-combined carrier phase to form a modified double-difference phase-combined carrier phase.

In some aspects, the techniques described herein relate to a navigation system, wherein the processing unit is further configured to combine the modified single-difference phase-combined pseudorange with the modified double-difference phase-combined carrier phase to estimate the clock difference.

In some aspects, the techniques described herein relate to a navigation system, wherein the processing unit is further configured to determine one of position, velocity, or timing of the spacecraft for a landing maneuver using the combined signal.

In some aspects, the techniques described herein relate to a navigation system, wherein the combiner includes one of a Wilkinson, a resistive, or a hybrid combiner.

In some aspects, the techniques described herein relate to a navigation system, wherein the combined signal includes a phase combined signal.

In some aspects, the techniques described herein relate to a navigation system, wherein the navigation parameter includes one of position, velocity, or timing of the spacecraft.

In some aspects, the techniques described herein relate to a method including: combining a first signal received from a first antenna with a second signal received from a second antenna to form a combined signal, wherein the first antenna is positioned in a first direction, wherein the second antenna is positioned in a second direction that is about 180 degrees from the first direction, wherein a first receiver is coupled to the first antenna, wherein the first receiver has a first port configured to receive the combined signal and a second port configured to receive the first signal from the first antenna, wherein a second receiver is coupled to the second antenna, wherein the second receiver has a first port configured to receive the combined signal and a second port configured to receive the second signal from the second antenna; estimating a clock difference between the first receiver and the second receiver using the combined signal; time-synchronizing the first signal with the second signal using the estimated clock difference; and determining a navigation parameter for a spacecraft using the time-synchronized first and second signals.

In some aspects, the techniques described herein relate to a method, wherein estimating a clock difference further includes: single-differencing a phase-combined pseudorange of the second receiver from a phase-combined pseudorange of the first receiver to form a single-difference phase-combined pseudorange; and removing one or more outliers from the single-difference phase-combined pseudorange to form a modified single-difference phase-combined pseudorange.

In some aspects, the techniques described herein relate to a method, wherein estimating a clock difference further includes: double-differencing a phase-combined carrier phase of the second receiver from a phase-combined carrier phase of the first receiver to form a double-difference phase-combined carrier phase; and removing one or more outliers from the double-difference phase-combined carrier phase to form a modified double-difference phase-combined carrier phase.

In some aspects, the techniques described herein relate to a method, wherein estimating a clock difference further includes combining the modified single-difference phase-combined pseudorange with the modified double-difference phase-combined carrier phase to estimate the clock difference.

In some aspects, the techniques described herein relate to a method, further including determining one of position, velocity, or timing of the spacecraft for a landing maneuver using the combined signal.

In some aspects, the techniques described herein relate to a method, wherein the combined signal includes a phase combined signal.

In some aspects, the techniques described herein relate to a method, wherein the navigation parameter includes one of position, velocity, or timing of the spacecraft.

In some aspects, the techniques described herein relate to a non-transitory, computer-readable medium including computer-executable instructions for controlling a spacecraft, wherein the computer-executable instructions, when executed by a computer system, cause the computer system to: estimate a clock difference between a first receiver and a second receiver using a combined signal, wherein the combined signal is a combination of a first signal received from a first antenna and a second signal received from a second antenna, wherein the first antenna is positioned in a first direction, wherein the second antenna is positioned in a second direction that is about 180 degrees from the first direction, wherein the first receiver is coupled to the first antenna, wherein the first receiver has a first port configured to receive the combined signal and a second port configured to receive the first signal from the first antenna, wherein the second receiver is coupled to the second antenna, wherein the second receiver has a first port configured to receive the combined signal and a second port configured to receive the second signal from the second antenna; time-synchronize the first signal with the second signal using the estimated clock difference; and determine a navigation parameter for a spacecraft using the time-synchronized first and second signals.

In some aspects, the techniques described herein relate to a non-transitory, computer-readable medium, wherein the computer-executable instructions, when executed, further cause the computer system to: single-difference a phase-combined pseudorange of the second receiver from a phase-combined pseudorange of the first receiver to form a single-difference phase-combined pseudorange; and remove one or more outliers from the single-difference phase-combined pseudorange to form a modified single-difference phase-combined pseudorange.

In some aspects, the techniques described herein relate to a non-transitory, computer-readable medium, wherein the computer-executable instructions, when executed, further cause the computer system to: double-difference a phase-combined carrier phase of the second receiver from a phase-combined carrier phase of the first receiver to form a double-difference phase-combined carrier phase; and remove one or more outliers from the double-difference phase-combined carrier phase to form a modified double-difference phase-combined carrier phase.

In some aspects, the techniques described herein relate to a non-transitory, computer-readable medium, wherein the computer-executable instructions, when executed, further cause the computer system to combine the modified single-difference phase-combined pseudorange with the modified double-difference phase-combined carrier phase to estimate the clock difference.

In some aspects, the techniques described herein relate to a non-transitory, computer-readable medium, wherein the computer-executable instructions, when executed, further cause the computer system to determine one of position, velocity, or timing of the spacecraft for a landing maneuver using the combined signal.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 3 is a flow diagram depicting an example position estimation routine illustratively implemented by an analog front-end, one or more receivers, and/or a navigation processing unit.

DETAILED DESCRIPTION

Figure 1:
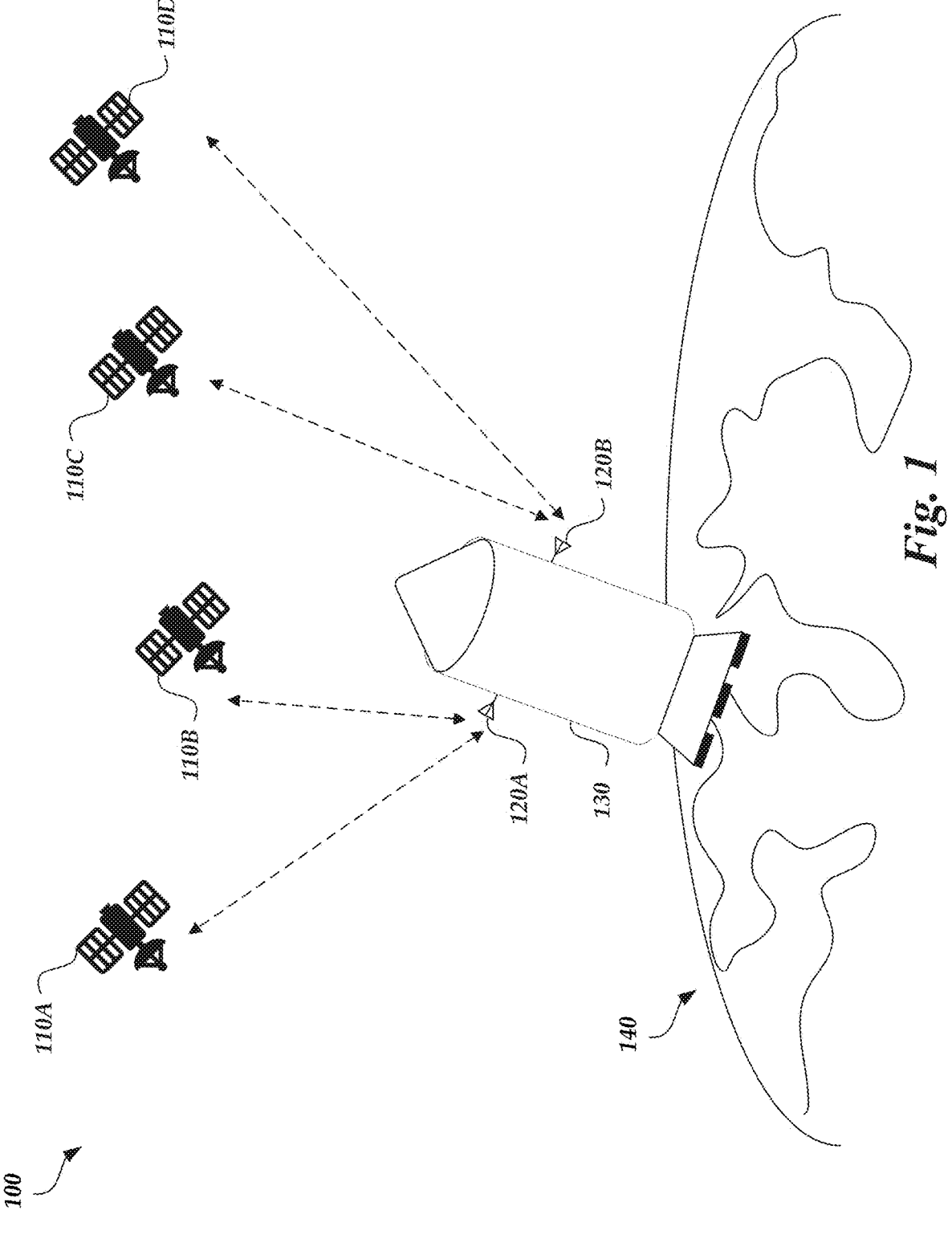
FIG. 1 depicts a schematic diagram illustrative of a satellite navigation environment in which various embodiments according to the present disclosure can be implemented.

As described above, a satellite navigation system can guide an extraterrestrial vehicle (e.g., a space lander, a rover, a rocket, a satellite, a spaceship, a space shuttle, and/or any other type of vehicle that is capable of operating in space and/or on an extraterrestrial object other than Earth (hereinafter a "spacecraft")) to an intended destination. Typically, a satellite navigation system may include one or more satellites that are capable of communicating with a spacecraft. For example, a spacecraft may include an antenna, a receiver, signal processing equipment, and/or the like that are used to receive and process a signal received from one or more satellites that form the satellite navigation system.

However, the design and/or position of the antenna, the receiver, the signal processing equipment, and/or the like can limit the functionality of the spacecraft while in flight or while attempting a particular maneuver. For example, it may be desired that the spacecraft be capable of performing certain maneuvers and/or determinations, such as an autonomous flight safety system (AFSS) determination (e.g., autonomous flight termination or destruction decisions that are determined and executed using software-based rules), an ascent maneuver (e.g., travel from the surface of an extraterrestrial object to outer space), an entry maneuver (e.g., travel from outer space toward the surface of an extraterrestrial object from which the spacecraft did not originate) or a re-entry maneuver (e.g., travel from outer space toward the surface of an extraterrestrial object to or from which the spacecraft had previously traveled), a landing maneuver, an orbit determination (e.g., determining orbital parameters when the spacecraft is in a given orbit and/or transmitting the spacecraft's orbital state without the use of satellite navigation), and/or the like (hereinafter "maneuvers and/or determinations"). To determine position, velocity, and/or timing to enable one or more of these maneuvers to be performed, a spacecraft may be in communication with a minimum number of satellites in the satellite navigation system (e.g., 4, 5, 6, 7 etc. satellites). The spacecraft may not only travel vertically (e.g., perpendicular to the surface of an extraterrestrial object, such as perpendicular to the surface of Earth), but may also travel in any direction in a three dimensional space with respect to the surface of an extraterrestrial object (e.g., a spacecraft can travel in a direction toward space, toward a surface of an extraterrestrial object, parallel to a surface of the extraterrestrial object, etc.) and/or can rotate along any axis that passes through the spacecraft (e.g., a longitudinal axis, a transverse axis, vertical axis, etc.). As a result, a single antenna design (e.g., a spacecraft that has a single antenna for communicating with the satellite navigation system) is unlikely to provide the near-spherical coverage that may be important for establishing communication with the minimum number of satellites (e.g., the single antenna may not have a direct line of sight with the minimum number of satellites) when the spacecraft is positioned at any given angle or traveling in any given direction. Even positioning the single antenna on top of the spacecraft (e.g., on the nose of the spacecraft) may not provide the antenna with enough visibility to detect signals from the minimum number of satellites when the spacecraft is positioned at certain angles or attempting certain maneuvers. In fact, having the antenna positioned on top of the spacecraft may involve the addition of other hardware that may increase the complexity of the communication hardware.

To address this issue, the spacecraft may be outfitted with multiple antennas. For example, a spacecraft can include two (or more) antennas that can be approximately 180° apart (e.g., two antennas that are on opposite sides of the spacecraft such that the boresights of the two antennas form approximately an 180° angle from one another, which is also referred to herein as "180-degree dual-opposed antennas").

In one typical design, the two antennas may detect signals that are then combined and subsequently processed by a single receiver (e.g., a single receiver with a single RF input). This design may allow the receiver to track some or all of the visible satellites in the satellite navigation system, which may allow the receiver to directly compute position and be useful for performing maneuvers and/or determinations as described herein. However, an interference pattern in the overlap region between the antennas can cause signal distortion (e.g., signal fading and/or multipath issues) that can degrade the accuracy of the computed position, thereby making it difficult to perform a landing maneuver.

In another typical design, the two antennas may detect signals that are each processed by different receivers. Because there may be no measurable interference between the two antennas or signal distortion with this design, this design may allow the spacecraft to accurately perform an ascent, an entry, a re-entry, a landing, and/or an orbit determination. However, having two receivers creates an additional unknown (e.g., a difference in clock between the two receivers) that may involve requiring additional measurements for the spacecraft to solve for this unknown and that may reduce the accuracy and availability of the position computation such that it may not be possible to execute one or more maneuvers and/or determinations as described herein.

Accordingly, described herein is an improved antenna and receiver design that overcomes the technical deficiencies of the typical designs described above, thereby allowing a spacecraft to safely and/or accurately perform one or more maneuvers and/or determinations as described herein. For example, a spacecraft can be equipped with two, 180-degree dual-opposed antennas and two receivers. The two receivers may be dual radio frequency (RF) receivers in which each receiver has a limited secondary RF capability. Specifically, a dual RF receiver may not be capable of acquiring a satellite on a secondary RF of the receiver if the satellite has not first been seen or acquired by a primary RF of the receiver. A signal captured or measured by a first antenna can be routed to a secondary RF of the first receiver and to a combiner or other component configured to perform a phase combination operation. A signal captured or measured by a second antenna can be routed to a secondary RF of the second receiver and to the combiner or other component configured to perform the phase combination operation. The combiner or other component can perform the phase combination operation on the signal captured by the first receiver and on the signal captured by the second receiver to produce a phase combined signal, and can route the phase combined signal to the primary RF of the first receiver and to the primary RF of the second receiver. Thus, the first receiver and the second receiver may each receive two signals, where one is the same signal (e.g., the phase combined signal) and where one is a different signal (e.g., either the signal captured by the first antenna or the signal captured by the second antenna).

Because both receivers may receive at least the same signal, the navigation equipment of the spacecraft (e.g., a navigation processing unit) can solve for the clock bias of the second receiver relative to the first receiver using a time transfer operation such as a pseudorange single-difference. As a result, the additional unknown created from having two receivers can be solved without additional hardware being installed in the spacecraft, and the spacecraft can safely perform maneuvers and/or determinations as described herein with high availability in response. Thus, the two receiver design described herein is an improvement over the typical two receiver design described above. In fact, this improved design also benefits from the two receiver design benefits described above, meaning that the spacecraft can also accurately perform an ascent, an entry, a re-entry, a landing, and/or an orbit determination.

The foregoing aspects and many of the attendant advantages of this disclosure will become more readily appreciated as the same become better understood by reference to the following detailed description, when taken in conjunction with the accompanying drawings.

Example Spacecraft Navigation Environment

FIG. 1 depicts a schematic diagram illustrative of a satellite navigation environment 100 in which various embodiments according to the present disclosure can be implemented. As illustrated in FIG. 1, the satellite navigation environment 100 may include a satellite navigation system that includes satellites 110A-D, a spacecraft 130, and an extraterrestrial object 140 from which or to which the spacecraft 130 is traveling (e.g., Earth, a moon, another planet, an asteroid, etc.). While FIG. 1 depicts the satellite navigation system as having four satellites 110A-D, this is not meant to be limiting. For example, the satellite naviga-
tion system can include any number of satellites (e.g., 1, 2,
3, 5, 6, 7, etc.).

The spacecraft 130 may include a first antenna 120A and
a second antenna 120B. The first and second antennas
120A-B may be 180-degree dual-opposed antennas. For
example, the antenna 120A may point in a first direction and
the antenna 120B may point in a second direction that is
about 180 degrees from the first direction (e.g., 180
degrees+/−0.01, 0.1, 1, 10 degrees, etc.). While FIG. 1
depicts the spacecraft 130 as having two antennas, this is not
meant to be limiting. For example, the spacecraft 130 can
include any number of antennas (e.g., 2, 3, 4, 5, 6, 7, etc.).

The spacecraft 130 may be traveling to, from, and/or in
orbit with the extraterrestrial object 140. The spacecraft 130
may use the satellites 110A-D and the antennas 120A-B to
perform various maneuvers and/or determinations as
described herein with respect to the extraterrestrial object
140. Because the antennas 120A-B are on opposite ends of
the spacecraft 130, each antenna 120A-B may have a
different view of the sky and/or communicate with a differ-
ent set of satellites 110A-D. In some cases, there may be no
overlap between the set of satellites 110A-D with which the
antenna 120A communicates and the set of satellites 110A-D
with which the antenna 120B communicates. In other cases,
there may be at least some overlap between the set of
satellites 110A-D with which the antenna 120A communi-
cates and the set of satellites 110A-D with which the antenna
120B communicates. As the spacecraft 130 changes attitude
or position, the set of satellites 110A-D with which the
antennas 120A-B communicate may change. In an embodi-
ment, the antennas 120A-B collectively provide a full view
of the sky.

Further, the satellite navigation system as described and
depicted in FIG. 1 can be implemented in a terrestrial
application (e.g., vehicle, watercraft, aircraft, handheld
device, wearable device, and/or the like) in addition and/or
as an alternative to the implementation as described herein.
For example, satellites 110A-D may transmit signals to a
terrestrial application located on the surface of and/or near
the surface of extraterrestrial object 140. The terrestrial
application can further include, for example, antennas
120A-B positioned on the terrestrial application such that
the antennas 120A-B function as described herein. Addi-
tionally, any of the functionality and/or features described
herein with reference to the satellite navigation system of
FIGS. 1, 2, and/or 3 may be applicable to a terrestrial
application.

Figure 2:
FIG. 2 depicts example navigation components of the spacecraft.

The spacecraft 130 may further include various naviga-
tion components that process signals received by the anten-
nas 120A-B to enable some or all of the maneuvers
described herein. The navigation components are described
in greater detail below with respect to FIG. 2.
Example Spacecraft Navigation Components FIG. 2 depicts example navigation components of the
spacecraft 130. As illustrated in FIG. 2, the spacecraft 130
may include the antennas 120A-B, amplifiers 202A-B, an
analog front-end 203, receivers 210A-B, and a navigation
processing unit 240. The analog front-end 203 may include
splitters 204A-B and a combiner 206. In an alternative
embodiment, the splitters 204A-B may instead be multi-
plexers and/or the combiner 206 may instead be a mixer. The
receiver 210A may include a primary RF 220A and a
secondary RF 220B, and the receiver 210B may include a
primary RF 230A and a secondary RF 230B. A first port of
the receiver 210A may serve as an interface that allows
signals to be routed to the primary RF 220A, a second port of the receiver 210A may serve as an interface that allows
signals to be routed to the secondary RF 220B, a first port
of the receiver 210B may serve as an interface that allows
signals to be routed to the primary RF 230A, and a second
port of the receiver 210B may serve as an interface that
allows signals to be routed to the secondary RF 230B. As an
illustrative example, each receiver 210A-B may be a NOVA-
TEL OEM7720 Dual RF GNSS receiver.

Unlike typical navigation systems that may include three,
four, five, etc. receivers (where each receiver in addition to
two is installed to assist with specific maneuvers, such as
any of the maneuvers and/or determinations as described
herein), the spacecraft 130 only includes two receivers
210A-B and is capable of performing the maneuvers
described herein with the two receivers 210A-B in some
embodiments. In other embodiments, the spacecraft 130 can
include more or less than two receivers 210A-B (e.g., one,
three, four, five, etc. receivers).

The amplifier 202A may be configured to amplify a signal
measured or detected by the antenna 120A (e.g., by a certain
decibel level), and the amplifier 202B may similarly be
configured to amplify a signal measured or detected by the
antenna 120B (e.g., by a certain decibel level). Either or both
of the amplifiers 202A-B are optional components. In one
example, either or both of the amplifiers 202A-B can include
a low noise amplifier (LNA), and/or another type of ampli-
fier. If an amplifier 202A-B is not present, then the signal
measured or detected by the antennas 120A-B may be routed
directly to the analog front-end 203.

The splitter 204A may be configured to receive the signal
amplified by the amplifier 202A and split the amplified
signal such that amplified signal is routed both to the
combiner 206 and to the secondary RF 220B of the receiver
210A (e.g., to the second port of the receiver 210A). The
splitter 204B may be configured to receive the signal ampli-
fied by the amplifier 202B and split the amplified signal such
that amplified signal is routed both to the combiner 206 and
to the secondary RF 230B of the receiver 210B (e.g., to the
second port of the receiver 210B).

The combiner 206 can be configured to perform a phase
combination operation on the amplified signal originating
from the antenna 120A and the amplified signal originating
from the antenna 120B to form a phase combined signal. For
example, the combiner 206 can electrically combine the
amplified signal originating from the antenna 120A and the
amplified signal originating from the antenna 120B to form
the phase combined signal. As an illustrative example, the
combiner 206 (e.g., divider or the like) may be one or more
of a combination including a Wilkinson, resistive, and/or
hybrid combiner that electronically combines the amplified
signal originating from the antenna 120A and the amplified
signal originating from the antenna 120B to form the phase
combined signal. The combiner 206 may route the phase
combined signal to the primary RF 220A of the receiver
210A (e.g., to the first port of the receiver 210A) and the
primary RF 230A of the receiver 210B (e.g., to the first port
of the receiver 210B).

As described herein, because both receivers 210A-B
receive a common RF signal (e.g., the phase combined
signal), each receiver 210A-B can track all visible satellites
110A-D, which makes it possible for the receiver(s) 210A-B
to internally compute a position, velocity, and time. The
computed position, velocity, and time may then be used
directly by, for example, the AFSS system, and/or for any
other maneuvers and/or determinations as described herein.
Further, when each receiver 210A-B utilizes the common
RF signal (e.g., the phase combined signal), the likelihood that both receivers 210A-B will have sufficient satellites to internally estimate the position, velocity, and time solution increases substantially. For example, when receiver 210A and/or 210B obtains a valid position, velocity, and time solution (and/or optionally including a GNSS almanac and/ or ephemeris data) using the phase combined signal on its primary RF with full view of the sky, the receiver 210A and/or 210B can use this position, velocity, and time solutions to more efficiently search for new satellites on its secondary RF with only partial view of the sky. Thus, when receivers 210A-B utilize the phase combined signal, acquisition sensitivity drastically increases and/or time to acquire for new satellites decreases. In contrast, if each receiver 210A and/or 210B only sees part of the sky (e.g., not utilizing the phase combined signal), receiver 210A and/or 210B may not compute a valid position, velocity, and time solution during that portion of the mission, resulting in slow and insensitive satellite acquisition.

Further, receivers 210A-B may compute the position, velocity, and/or time solution by estimating pseudorange and carrier phase measurements from the phase combined signal as if the signal were received from a single antenna. In at least one example, the position, velocity, and time solution can be estimated using the pseudorange and carrier phase measurements from the phase combined signal by using an iterative least squares method, and/or using an extended Kalman filter. However, estimating pseudorange and carrier phase measurements from the combined signal may include one or more errors in the position, velocity, and time solution due to, for example, the uncompensated lever arm between antenna 120A and 120B, interference and/or distortion from a phase-combined multipath, and/or delay differences between the RF paths. These errors may exist predominantly in the position domain, and typically result in errors less than the distance between the antenna 120A and 120B (assuming matched antenna cable lengths and delays).

Also, because both receivers 210A-B receive a common RF signal, it may be possible to determine the clock difference between the two receivers 210A-B without requiring the installation of extra hardware components. Determining the clock difference, for example between receiver 210A and/or receiver 210B, can provide accurate position, velocity, and/or timing calculations using (time-corrected or time-synchronized versions of) the amplified signals, which makes the position, velocity, and/or timing calculation suitable for use during maneuvers and/or determinations like, for example, landing maneuvers. Also, because both receivers 210A-B also receive a different RF signal (e.g., the receiver 210A receives the amplified signal originating from the antenna 120A and the receiver 210B receives the amplified signal originating from the antenna 120B), the different RF signals lack radio-frequency distortion and/or fading (which may occur when producing a phase combined signal) and therefore it may be possible to perform, for example, landing maneuvers using software and/or hardware time-corrected versions of these different RF signals.

In some examples, a position, velocity, and time solution may be computed by receiver(s) 210A-B using the time-synchronized RF signal by time-correcting the received signal from a first receiver (e.g., receiver 210A) to bring the measured signal into the time domain of a second receiver (e.g., receiver 210B). Next, each receiver 210A-B may perform lever-arm corrections to the signals to bring the measured signals to the same phase center. In some examples, an attitude solution may be generated by the receiver(s) 210A-B based on a received GNSS-inertial measurement unit (IMU) measurement. Further, the integrity of the signals can be assessed by the receiver(s) 210A-B (e.g., via Receiver Autonomous Integrity Monitoring (RAIM)) to detect and reject outliers. The receiver(s) 210A-B can then process the GNSS measurements and IMU measurements in an Extended Kalman Filter to generate the position, velocity, and time, as well as attitude, along with associated uncertainties. When computing the position, velocity, and time solution using the time-synchronized RF signal, a small time difference between antenna 120A and antenna 120B may exist. The time difference can be attributed to differences in time delays of respective antennas 120A-B as well as time delays associated with one or more additional components (e.g., amplifiers 202A-B, wiring, etc.). In some examples, the time difference may be characterized as small and slow-varying, thus the time difference may be compensated for, by receiver 210A-B and/or the like.

For example, the navigation processing unit 240 can determine the clock difference between the receivers 210A-B using the phase combined signal, and/or can calculate position, velocity, and/or timing information using the phase combined signal (e.g., for the purpose of determining position for AFSS and/or for any other maneuvers and/or determinations as described herein, except landing maneuvers). The navigation processing unit 240 may also use the amplified signal received by the receiver 210A and/or the amplified signal received by the receiver 210B to calculate position, velocity, and/or timing information for landing maneuvers (and/or any other maneuvers and/or determinations as described herein except AFSS determinations).

To determine the clock difference, the navigation processing unit 240 can subtract (e.g., single-difference) the phase-combined pseudoranges of the receiver 210B from the phase-combined pseudoranges of the receiver 210A to form a single-difference phase-combined pseudorange. For example, the phase-combined pseudorange of a receiver 210A-B may be the speed of light multiplied by the summation of the receiver 210A-B clock difference and the time it takes for a signal transmitted by a satellite 110A-D to reach the receiver 210A-B (e.g., where the phase combined signal may be derived from the signal transmitted by the satellite 110A-D and can be multiplied by the speed of light to determine the phase-combined pseudorange). The navigation processing unit 240 may calculate the phase-combined pseudorange of a receiver 210A-B accordingly. The subtraction operation may result in a cancellation of the phase-combined signal, leaving the difference in receiver 210A-B clocks and thermal noise. The remaining signal may form the single-difference phase-combined pseudorange. The navigation processing unit 240 can then remove outliers from the single-difference phase-combined signal (e.g., where outliers are defined as having a threshold difference from a median signal value) and/or average the single differences to form a modified single-difference phase-combined pseudorange. The modified single-difference phase-combined pseudorange may represent a coarse estimate of the clock difference between the receivers 210A-B.

Before, during, and/or after forming the modified single-difference phase-combined signal, the navigation processing unit 240 can subtract the time-difference carrier phase measurements of a first receiver (e.g., receiver 210A) from the time difference carrier phase measurements of a second receiver (e.g., receiver 210B), resulting in a double-difference carrier phase. Each single-satellite double-difference carrier phase measurement can provide, for example, a precise estimate of the change in clock bias difference between receivers 210A-B. In some examples, the navigation processing unit 240 can further remove outliers (e.g., cycle slips) by comparing the distance of individual single-satellite double-difference estimates to the median of one or more combined measurements of the double-difference estimates against a threshold.

The navigation processing unit 240 can combine the modified single-difference phase combined pseudorange with the modified double-difference phase-combined carrier phase using a Hatch filter to form a (smoothed) clock difference estimate (which is referred to herein as a bulk clock difference estimate). Optionally, the navigation processing unit 240 can add the bulk clock difference estimate to telemetry data.

Once the bulk clock difference estimate is calculated, the navigation processing unit 240 can time-synchronize signals received by the secondary RF 220B of the receiver 210A with signals received by the secondary RF 230B of the receiver 210B using the bulk clock difference estimate. By synchronizing the signals received by each receiver 210A-B, the navigation processing unit 240 can then generate more accurate position, velocity, and/or timing calculations for landing and/or other maneuvers by time-synchronizing the amplified signal originating from the antenna 120A with the amplified signal originating from the antenna 120B, and using the time-synchronized amplified signals to calculate the position, velocity, and/or timing. Some parameters that the navigation processing unit 240 may set, calculate, or determine for determining the bulk clock difference estimate can include a minimum receiver 210A-B lock time, a maximum code residual from median (which can be used to identify outliers to remove), a maximum carrier residual, a minimum number of satellites 110A-D after outliers are removed, and/or a Hatch filter time constant.

Although the bulk clock difference provides an accurate estimate of the differences in the receiver clock biases as described herein, the bulk clock difference does not compensate for delay differences between, for example, antennas 120A-B, amplifiers 202A-B, and RF cables associated with the system. The uncompensated delay difference may be minimized by utilizing matching components, by calibration, and/or the like. In addition, residual delay difference after matching and/or calibration may be small and slowly varying (for example, as a function of a temperature difference between antennas 120A-B, amplifiers 202A-B, RF cables, and/or any other components associated with the system). In some examples, a more accurate position, velocity, and/or time solution may be achieved by compensating for any residual delay difference by, for example, creating an observable state in an extended Kalman filter.

In some embodiments, some and/or all of the functionality of the navigation processing unit 240, receiver 210A-B, components of the analog front-end 203, and/or amps 202A-B may be combined and/or performed by one, two, three, or more receivers. For example, in a typical embodiment of a single receiver system utilizing dual antenna inputs, a first input can be used for position, velocity, and time, while the second input may be used for heading. In some embodiments of a single receiver implementation, a single receiver can include hardware components and/or configurable firmware (e.g., an application specific integrated circuit (ASIC), and/or field programmable gate array (FPGA) and/or the like) to perform one or more of the functionalities as described herein. The hardware components and/or firmware of a single receiver may be configured to receive and/or process signal(s) from one, two, or more antennas, such as antenna 120A and/or antenna 120B as described herein. The single receiver may amplify the signals (e.g., similar to amplifiers 202A-B), split one or more respective signals (e.g., similar to splitter 204A-B), combine signals (e.g., similar to combiner 206), and/or determine a position, velocity, and/or time solution, and/or any other computation described herein, based on the one or more received signals.

Example Position Estimation Routine

FIG. 3 is a flow diagram depicting an example position estimation routine 300 illustratively implemented by an analog front-end, one or more receivers, and/or a navigation processing unit. As an example, the analog front-end 203, the receivers 210A-B, and/or the navigation processing unit 240 can be configured to execute the position estimation routine 300. The position estimation routine 300 begins at block 302.

At block 304, a first signal received from a first antenna is combined with a second signal received from a second antenna to form a combined signal. For example, a combiner 206 can combine the first and second signals. The combined signal may be an electrical combination of the first signal and the second signal, such as an electrical combination produced by a Wilkinson, resistive, and/or hybrid combiner. Optionally, the first and/or second signals may be amplified by different amplifiers or the same amplifier prior to being combined.

At block 306, the first signal and a combined signal are transmitted to a first receiver. The first signal and the combined signal may be sent to different RFs of the first receiver.

At block 308, the second signal and the combined signal are transmitted to a second receiver. For example, the second signal and the combined signal may be sent to different RFs of the second receiver.

At block 310, a clock difference is estimated between the first and second receivers using the combined signal. For example, a bulk clock difference estimate can be estimated by determining a single-difference of the phase-combined pseudoranges of the receivers, determining a double-difference of the phase-combined carrier phases of the receivers, removing outliers from the single-difference phase-combined pseudorange and/or from the double-difference phase-combined carrier phase, and applying a Hatch filter to the outlier-removed single-difference phase-combined pseudorange and the outlier-removed double-difference phase-combined carrier phase. With the bulk clock difference estimate calculated, the navigation processing unit can time-synchronize signals received by the first and second receivers using the bulk clock difference estimate, and use the time-synchronized signals to generate position, velocity, and/or timing calculations that may be sufficient for performing landing maneuvers.

Optionally, after the clock difference is estimated, the measurements of either the first and/or second receiver can be corrected to bring both receivers into the same clock domain. The measurements of the first and/or second receiver may be corrected by using, for example, the estimated clock difference. Further, an additional optional operation may include adjusting one or more position, velocity, and/or time calculations to compensate and/or correct for the lever arm measurement between one or more antennas and/or the center of navigation (e.g., a position on the spacecraft, the navigation processing unit 240, and/or the like).

At block 312, a navigation parameter for a spacecraft is determined based at least on the first signal or the second signal. For example, the navigation parameter can be position, velocity, and/or timing for the spacecraft for a time instant at which the spacecraft is performing any maneuver or determination described herein. The first signal and/or the second signal may be time-synchronized using the bulk clock difference estimate prior to the navigation parameter being determined. As a further example, a navigation parameter can include estimating vehicle state (such as the position, velocity, time, and/or altitude of the vehicle) by, for example, combining the corrected GNSS pseudorange and one or more of the carrier phase measurements using, for example, an extended Kalman filter. After the navigation parameter is determined, the position estimation routine 300 ends, as shown at block 314.

Terminology

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of $\pm 1\%$, $\pm 5\%$, $\pm 10\%$, or $\pm 20\%$.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A navigation system comprising:
   a first antenna positioned in a first direction;
   a second antenna positioned in a second direction that is about 180 degrees from the first direction;
   a combiner coupled to the first antenna and the second antenna, the combiner configured to combine a first signal received from the first antenna with a second signal received from the second antenna to form a combined signal;
   a first receiver coupled to the first antenna and the combiner, the first receiver having a first port configured to receive the combined signal from the combiner and a second port configured to receive the first signal from the first antenna;
   a second receiver coupled to the second antenna and the combiner, the second receiver having a first port configured to receive the combined signal from the combiner and a second port configured to receive the second signal from the second antenna; and
   a processing unit coupled to the first receiver and the second receiver, the processing unit configured to:

estimate a clock difference between the first receiver and the second receiver using the combined signal, time-synchronize the first signal with the second signal using the estimated clock difference, and determine a navigation parameter for a spacecraft using the time-synchronized first and second signals.

2. The navigation system of claim 1, wherein the processing unit is further configured to:

single-difference a phase-combined pseudorange of the second receiver from a phase-combined pseudorange of the first receiver to form a single-difference phase-combined pseudorange; and remove one or more outliers from the single-difference phase-combined pseudorange to form a modified single-difference phase-combined pseudorange.

3. The navigation system of claim 2, wherein the processing unit is further configured to:

double-difference a phase-combined carrier phase of the second receiver from a phase-combined carrier phase of the first receiver to form a double-difference phase-combined carrier phase; and remove one or more outliers from the double-difference phase-combined carrier phase to form a modified double-difference phase-combined carrier phase.

4. The navigation system of claim 3, wherein the processing unit is further configured to combine the modified single-difference phase-combined pseudorange with the modified double-difference phase-combined carrier phase to estimate the clock difference.

5. The navigation system of claim 1, wherein the processing unit is further configured to determine one of position, velocity, or timing of the spacecraft for a landing maneuver using the combined signal.

6. The navigation system of claim 1, wherein the combiner comprises one of a Wilkinson, a resistive, or a hybrid combiner.

7. The navigation system of claim 1, wherein the combined signal comprises a phase combined signal.

8. The navigation system of claim 1, wherein the navigation parameter comprises one of position, velocity, or timing of the spacecraft.

9. A method comprising:

combining a first signal received from a first antenna with a second signal received from a second antenna to form a combined signal, wherein the first antenna is positioned in a first direction, wherein the second antenna is positioned in a second direction that is about 180 degrees from the first direction, wherein a first receiver is coupled to the first antenna, wherein the first receiver has a first port configured to receive the combined signal and a second port configured to receive the first signal from the first antenna, wherein a second receiver is coupled to the second antenna, wherein the second receiver has a first port configured to receive the combined signal and a second port configured to receive the second signal from the second antenna;

estimating a clock difference between the first receiver and the second receiver using the combined signal;

time-synchronizing the first signal with the second signal using the estimated clock difference; and determining a navigation parameter for a spacecraft using the time-synchronized first and second signals.

10. The method of claim 9, wherein estimating a clock difference further comprises:

single-differencing a phase-combined pseudorange of the second receiver from a phase-combined pseudorange of the first receiver to form a single-difference phase-combined pseudorange; and removing one or more outliers from the single-difference phase-combined pseudorange to form a modified single-difference phase-combined pseudorange.

11. The method of claim 10, wherein estimating a clock difference further comprises:

double-differencing a phase-combined carrier phase of the second receiver from a phase-combined carrier phase of the first receiver to form a double-difference phase-combined carrier phase; and removing one or more outliers from the double-difference phase-combined carrier phase to form a modified double-difference phase-combined carrier phase.

12. The method of claim 11, wherein estimating a clock difference further comprises combining the modified single-difference phase-combined pseudorange with the modified double-difference phase-combined carrier phase to estimate the clock difference.

13. The method of claim 9, further comprising determining one of position, velocity, or timing of the spacecraft for a landing maneuver using the combined signal.

14. The method of claim 9, wherein the combined signal comprises a phase combined signal.

15. The method of claim 9, wherein the navigation parameter comprises one of position, velocity, or timing of the spacecraft.

16. A non-transitory, computer-readable medium comprising computer-executable instructions for controlling a spacecraft, wherein the computer-executable instructions, when executed by a computer system, cause the computer system to:

estimate a clock difference between a first receiver and a second receiver using a combined signal, wherein the combined signal is a combination of a first signal received from a first antenna and a second signal received from a second antenna, wherein the first antenna is positioned in a first direction, wherein the second antenna is positioned in a second direction that is about 180 degrees from the first direction, wherein the first receiver is coupled to the first antenna, wherein the first receiver has a first port configured to receive the combined signal and a second port configured to receive the first signal from the first antenna, wherein the second receiver is coupled to the second antenna, wherein the second receiver has a first port configured to receive the second signal from the second antenna and a second port configured to receive the combined signal;

time-synchronize the first signal with the second signal using the estimated clock difference; and determine a navigation parameter for a spacecraft using the time-synchronized first and second signals.

17. The non-transitory, computer-readable medium of claim 16, wherein the computer-executable instructions, when executed, further cause the computer system to:

single-difference a phase-combined pseudorange of the second receiver from a phase-combined pseudorange of the first receiver to form a single-difference phase-combined pseudorange; and remove one or more outliers from the single-difference phase-combined pseudorange to form a modified single-difference phase-combined pseudorange.

18. The non-transitory, computer-readable medium of claim 17, wherein the computer-executable instructions, when executed, further cause the computer system to:

17

18 double-difference a phase-combined carrier phase of the second receiver from a phase-combined carrier phase of the first receiver to form a double-difference phase-combined carrier phase; and remove one or more outliers from the double-difference phase-combined carrier phase to form a modified double-difference phase-combined carrier phase.

19. The non-transitory, computer-readable medium of claim 18, wherein the computer-executable instructions, when executed, further cause the computer system to combine the modified single-difference phase-combined pseudorange with the modified double-difference phase-combined carrier phase to estimate the clock difference.

20. The non-transitory, computer-readable medium of claim 16, wherein the computer-executable instructions, when executed, further cause the computer system to determine one of position, velocity, or timing of the spacecraft for a landing maneuver using the combined signal.

\* \* \* \* \*